United States Patent [19]

Valdes et al.

[11] Patent Number: 4,518,022
[45] Date of Patent: May 21, 1985

[54] OSCILLATING CUTTING ELEMENT

[76] Inventors: Guillermo A. Valdes, 4350 NW. 8 Ter., Apt. 3, Miami, Fla. 33126; Benjamin G. Pacheco, 1090 W. 69 Pl., Hialeah, Fla. 33014; Fernando F. Figueredo, 524 Ridgewood Rd., Key Biscayne, Fla. 33149; Armando Framil, 45 SW. 28 Rd., Miami, Fla. 33129

[21] Appl. No.: 427,837

[22] Filed: Sep. 29, 1982

[51] Int. Cl.³ .............................................. B27B 21/00
[52] U.S. Cl. .................................... 30/166 R; 83/830
[58] Field of Search ..................... 145/31 R; 30/166 R

[56]  References Cited
U.S. PATENT DOCUMENTS 2,696,228 12/1954 Bowen ............................. 30/166 R
3,192,973 7/1965 O'Link ............................. 145/31 R
4,218,820 8/1980 Cleva ............................... 30/166 R
4,240,203 12/1980 Johnson .......................... 145/31 R
4,258,763 3/1981 Figueredo et al. .............. 30/166 R Primary Examiner—Frederick R. Schmidt
Assistant Examiner—Joseph T. Zatarga

[57] ABSTRACT

A flexible cutting element composed of a plurality of chain links to which are attached tubular cutting units each of which is fabricated with a plurality of cutting teeth protruding upward and disposed at intervals extending radially around the periphery of the cutting unit. The direction of cutting of said cutting teeth are disposed alternately in opposite directions to enable said cutting element to cut a selected material when an oscillating motion is imparted. Various cutting unit designs are presented.

1 Claim, 27 Drawing Figures

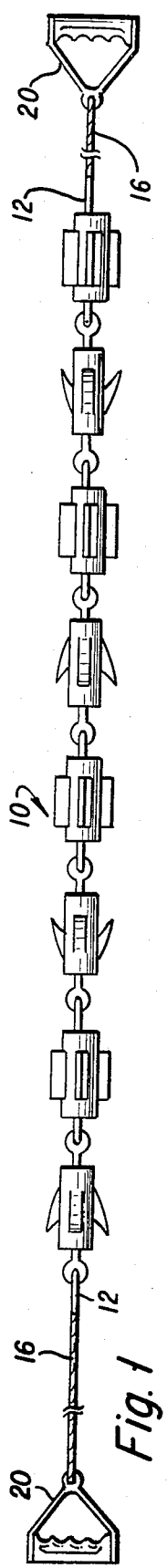
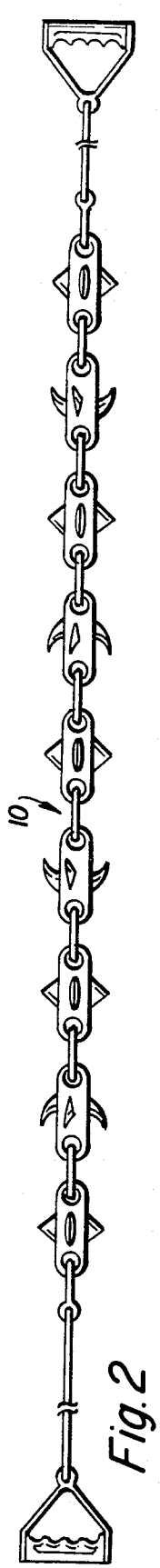
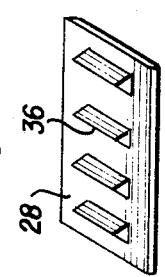
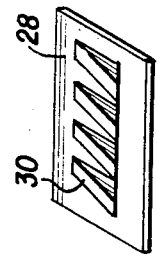
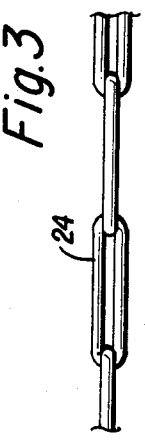
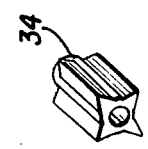
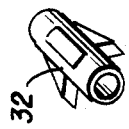
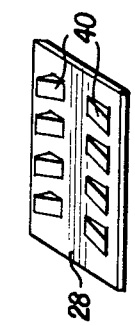
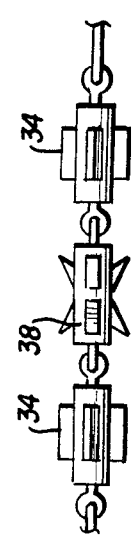

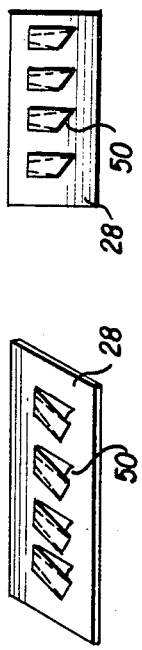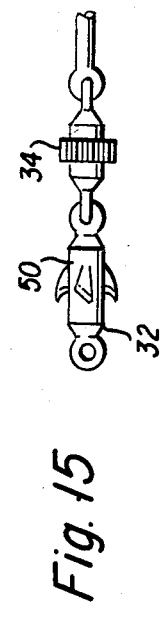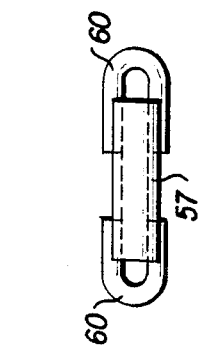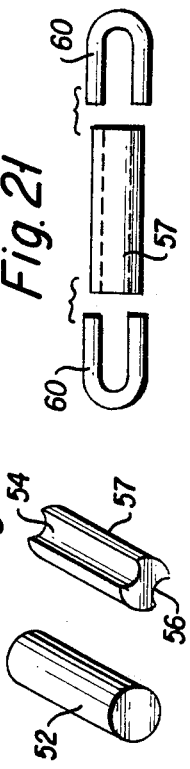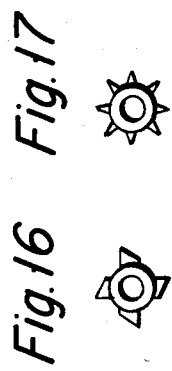

OSCILLATING CUTTING ELEMENT

BACKGROUND OF THE INVENTION

1. Field of the Invention

The present invention relates to cutting devices having flexible cutting elements and more particlarly, to cutting devices having flexible cutting elements composed of a plurality of chain links with cutting teeth disposed in a complete circle around the periphery of the cutting element.

2. Description of the Prior Art

The following describes cutting devices now in the market plus previously patented cutting devices in the field of manual and power cutting devices having flexible cutting elements.

A manually operated cutting element similar to the common "chain-saw" cutting chain (used with power driven chain saws) has been recently put on the market by the McCullough company. This cutting chain, however, is not tubular or cylindrical in nature and without the use of guiding element at the point of cutting, the cutting process will break down if the chain is twisted before a deep channel for cutting is created on the tree.

Other manually operated cutting devices fabricated from plurality of chain links which include a plurality of cutting teeth on a single side of the chain are disclosed in U.S. Pat. Nos. 325,364 (Shipe); 2,855,724 (Graves); 3,090,159 (Wimeerly), 3,747,652 (Meadows); and 323,602 (Shipe). The chains and cutting elements disclosed in the above recited patents are generally deflectable in a single plane.

U.S. Pat. No. 3,958,332 (Dates) discloses a power driven saw which causes a cable having a plurality of cutting elements disposed in a single direction to rotate in a single direction in order to provide a cutting action.

U.S. Pat. Nos. 1,175,302 (Salee); 789,512 (Waller); and 1,520,422 (Lind) disclose chain saw cutting devices having a cutting chain with teeth disposed in a single direction and plane.

U.S. Pat. No. 2,749,949 (De La Tramerye) discloses two "thin steel strips", or metal bands, with cutting teeth punched out of one side of the strips, said strips being twisted to form a spiral twisted saw.

U.S. Pat. No. 2,752,964 (Prusinski) discloses a flexible hand saw with cutting units attached to a cable. The cutting units have a cylindrical shape with a continuous sharp cutting edge around the cylindrical unit. The continuous cutting edge does not allow for particles to escape after being cut and clogs up with only a few uses.

U.S. Pat. No. 4,258,763 (by the same inventors of this present invention) disclose several flexible cutting elements with cutting teeth disposed around the periphery of the cutting element. Said patent, however, had as the purpose of its specific claims, the cutting apparatus described therein and not specific claims on the cutting elements. Therefore, it is intended by the present patent application, to claim specifically the cutting element designs being disclosed.

SUMMARY OF THE INVENTION

This invention presents a flexible cutting element composed of a chain with cutting units attached to links of the chain at predetermined distances on the chain. The cutting units can be of different designs (several of which are presented herein) but will generally be tubular in nature with cutting teeth disposed at intervals around the complete periphery of each cutting unit. The cutting units will be attached to the chain alternating the direction of cutting of each cutting unit so that by imparting an oscillatory motion a cutting process can be produced.

The flexible cutting element can be used either manually or with a power driven apparatus. For manual operations, the cutting element is attached to handles or to extension cables which are in turn attached to handles. For motorized operations, a power driven apparatus is also attached either directly to the cutting element or to extension cables which are attached to the cutting element. The extension cables are used to transmit the oscillating force from the power source, whether manual or motorized, to the object being cut by the cutting element. With the oscillating force transmitted to the point where the object will be cut, the cutting element can then be used to produce an oscillatory cutting process on that object.

An important aspect of this invention is the ability of the oscillating cutting element to perform a cutting process or operation without the need of a guiding element or guiding device of any kind at the point where the object is being cut. Conventional cutting devices in existance today require a guiding arm or device to maintain a single cutting plane at the point of cutting. The cutting teeth of all these conventional cutting devices are disposed in such a manner that they must be introduced into the object being cut in one singular plane and they must be maintained in that same cutting plane or else the cutting process will breakdown. The oscillating cutting element, however, can be twisted or juggled at the point where the cutting process is being performed and still maintain an effective cutting operation since its cutting teeth are disposed in a complete circle around the periphery of each cutting unit. It is this revolutionary feature that allows the present invention to perform cutting operations without the need of an operator or a guiding device at the point of cutting. The operator can therefore be positioned at a remote distance from the point where the cutting process will take place.

As a result of allowing the operator to position himself at a distance from the cutting process, this invention provides another very important feature in safety. By using this invention in either manual or motorized operations, the operator can be located sufficiently far away from the object being cut to remove himself from any possible danger or hazardous situations. This measure of safety can only be appreciated when considering normally hazardous cutting operations such as cutting high tree branches or very large trees which with the use of this invention can be cut from the ground and at a large distance from the point of cutting.

Another important aspect of this invention in motorized operations is its ability to cut a material without having the cutting element pass through the drive system of the equipment as in all existing motorized cutting devices. By not having the oscillating cutting element go through the drive system, it will never get clogged-up with particles from the object being cut. Existing motorized system require cleaning after every operation or during prolonged operations. This problem will be eliminated with the use of this invention.

Another important aspect of using this invention with motorized systems is that the size or width of the object being cut is not a limiting factor any more, as in existing cutting systems. By simply making the cutting element long enough or attaching sufficient standard size cutting elements together, any size object can be cut as long as the motorized unit is manufactured to provide sufficient force to do so. Another important aspect of this invention is its ability to maintain an effective cutting operation in normally difficult or impossible situations using conventional cutting devices or equipment. Cutting trees or branches in swamps, lakes, on the side of steep hills or mountains, or cutting a tree in the middle of a dense forest, are examples of extremely difficult cutting operations using conventional equipment for tree-cutting. With the present invention, however, a motorized model and extension cables can be used to transmit the oscillating force to any point where the cutting process might be required, while the operator and the equipment can be positioned in an appropriately chosen safe location.

DESCRIPTION OF DRAWINGS

The invention is pointed out with particularity in the appended claims; however, other objects and advantages together with the operation of the invention will be better understood by reference to the detailed description below taken in connection with the following illustrations wherein:

FIGS. 1 & 2 illustrate the hand powered version of the present invention.

FIGS. 3 & 4 illustrate a typical chain link design that can be used to support cutting units of the cutting element.

FIGS. 5 & 6 illustrate a sawing type tubular cutting unit with cutting teeth disposed in a single direction.

FIGS. 9 & 10 illustrate a bi-directional sawing type tubular cutting unit similar to that of FIGS. 5 & 6 with the exception that cutting teeth are disposed in two rows with the direction of cutting of one row of teeth opposite from the direction of cutting of the second and opposite row of teeth.

FIGS. 7 & 8 illustrate a knifing type tubular cutting unit.

FIGS. 11 & 12 illustrate sections of two possible cutting element designs with sawing type cutting units and a knifing cutting unit inserted in between every sawing type cutting unit.

FIGS. 13 & 14 illustrate another variation of the sawing type cutting unit illustrated in FIGS. 5 & 6 with cutting teeth slanted towards the back to allow cut wood particles to be dislodged towards the back of the cutting teeth and avoid clogging-up the teeth.

FIG. 15 illustrates a section of a cutting element with the slanted teeth cutting units of FIGS. 13 & 14.

FIG. 16 illustrates a front sectional view of the sawing type cutting unit of FIG. 15.

FIG. 17 illustrates a front sectional view of the knifing type cutting unit of FIG. 15.

FIGS. 18 through 24 illustrate a different type of chain link design to that of FIG. 4 which can effectively be used to support a cutting unit. This variation in chain link accentuates the fact that the type of chain link can vary substantially but the generic concept of this invention remains the same.

FIGS. 25 & 26 provide a three dimensional view of two similar sawing type cutting units but of different length and cutting teeth size to accentuate the fact that the size of a cutting unit may vary depending on the type of use.

FIG. 27 illustrates another "knifing" cutting element design with more knifing type edges than that illustrated in FIG. 8.

DESCRIPTION OF THE PREFERRED EMBODIMENT

In order to better illustrate the advantages of the present invention and its contributions to the art, a preferred hardware embodiment of the invention illustrated in FIG. 1 will now be described in some detail.

Referring now to FIG. 1, a cutting device of the present invention includes a flexible cutting element 10, first and second ends of the cutting elements 12 and 14, first and second extension cables 16 and 18 connected to ends 12 and 14, and first and second handles 20 and 22 connected to the extension cables. For close in work, extension cables 16 and 18 would not be required and handles 20 and 22 would be directly coupled to the ends 12 and 14 of the cutting element 10. FIG. 2 illustrates the same cutting device of FIG. 1 except that the cutting element 10 is different from that of FIG. 1. Both cutting elements 10 of FIGS. 1 and 2 will be further described below togehter with other possible cutting element variations that can be used.

Referring now to FIGS. 3 through 27 various embodiments of the cutting element 10 of this invention are illustrated. FIGS. 3 and 4 illustrate that a cutting element can be fabricated from a plurality of conventional oval shaped chain links. FIG. 3 illustrates a typical oval shaped chain link 24 with FIG. 4 showing the same link after it has been crimped inwardly to form a chain of dog bone shape 26. Cutting units are then attached over the crimped area to each link or to predetermined spaced apart links. FIGS. 5 through 8 illustrate a possible manufacturing process of how the cutting units of FIG. 1 can be fabricated. FIG. 5 shows that a flat metal plate 28 can have sawing type cutting teeth 30 punched upward from the main body of the plate through the manufacturing process. FIG. 6 also indicates that plate 28 can be formed into a tubular configuration 32 around each chain link and fused rigidly around each link using heat or electrical fusing processes. Thus, a cutting element composed of a cutting unit 32 with sawing type cutting teeth 30 disposed upwardly in a complete circle around the outer periphery of the cutting unit can be manufactured.

FIGS. 7 and 8 illustrate a "knifing" typecutting unit 34 which can be attached to alternating chain links in conjunction with the sawing type cutting units 32 shown in FIG. 6. FIG. 7 illustrates that a flat metal can have the knifing teeth 36 punched upward and sharpened during the manufacturing process, and FIG. 8 illustrates that the metal plate has been formed into a tubular cutting unit 34.

FIG. 11 illustrates that the preferred cutting element embodiment 10 will alternate attaching on every other chain link a sawing type cutting unit 32 and a knifing type cutting unit 34. In addition, the sawing type cutting units are attached to the cutting element such that the direction of cutting of each succeeding cutting unit 32 is oriented in an opposite cutting direction from the previous cutting units as illustrated in FIG. 1. Thus, by imparting an oscillatory force on the cutting element 10 over an object to be cut, half of the cutting units 32 will be in one direction and the other half will cut in the opposite direction. With the same oscillating force applied, the "knifing" cutting units 34, which are attached in between the sawing type cutting units 32, will be opening cutting channels and softening the object being cut to make it easier for the sawing cutting units to saw and cut into the object.

FIGS. 9 and 10 illustrate a bi-directional sawing type cutting unit design 38 with cutting teeth 40 already fabricated with the direction of cutting in opposite directions. The process of making this cutting unit is similar to that previously mentioned with a flat metal plate 28 having cutting teeth 40 punched upward and then having the punched plate formed over a chain link 26 in a tubular shape. FIG. 12 illustrates a section of cutting element with the bi-directional sawing type cutting unit 38 attached.

FIG. 13 illustrates the same general type of sawing type cutting unit presented in FIG. 6 except that the front of the cutting teeth 50 are fabricated in an angle towards the back of the cutting teeth to prevent wood particles from becoming lodged in the cutting teeth. FIG. 14 provides a top view of the same cutting unit and cutting teeth 50 design. The dashed lines indicate that the bottom of the cutting tooth is narrower than the the top. This cutting tooth design is very effective in dislodging all wood particles towards the back of the tooth and out the sides.

FIG. 15 illustrates a section of cutting element using the sawing type cutting unit of FIG. 13 with cutting teeth 50. FIG. 16 provides a front view of this slanted type cutting unit with the slant design of the cutting teeth 50. FIG. 17 illustrates a front view of the slicing unit depicted in FIG. 15.

Referring now to FIGS. 18 through 24 a different type of rigid chain-link/cutting unit assembly will be described to illustrate that different types of chain links can be used to manufacture an effective cutting element 10. FIG. 18 illustrates that a short rigid metal beam 52 with a diameter not to exceed one half inch in the majority of applications, can have two ridges 54 and 56 illustrated in FIG. 19 worked out of two parallel and opposite sides to form a base 57 for a cutting unit. Short sections of small diameter steel beams 58 shown in FIG. 20 can be formed into U-shaped configurations 60 shown in FIG. 21 and these can be inserted through both ends of base 57 over the ridges 54 and 56 as shown in FIG. 22 to lock into place any cutting unit attached to the base 57. Through heat or fussion processes the U-shaped beams 60 can be locked rigidly in place to prevent dismantling or breaking apart. FIG. 23 provides a section view of a tubular cutting unit being attached to the base 57 and U-shaped beams 60 being inserted into place. FIG. 24 illustrates the final configuration of this chain link/cutting unit assembly.

Additional cutting unit designs are illustrated in FIGS. 25–27. FIG. 25 illustrates the sawing type cutting unit design depicted in FIGS. 13 and 14 in a tubular form with smaller and shorter cutting teeth slanted backwards and FIG. 26 illustrates the same cutting unit in a larger size. This is done to accentuate the fact that minor variations may be possible in cutting tooth design, size and shape.

FIG. 27 illustrates a "knifing" cutting unit similar to that of FIG. 8 except that additional "knifing" teeth 68 are fabricated into the unit to again accentuate possible variations in the design of the slicing unit.

As will be readily appreciated, one of the primary safety features of this invention is the ability to position the cutting element at a safe distance from a human operator whether the oscillating force is being provided by a machine operated by a human or directly by a human operator.

It will be apparent to those skilled in the art that the disclosed cutting device may be modified in numerous ways and may assume numerous embodiments other than the preferred forms specifically set out and described above. Accordingly, it is intended by the appended claims to cover all such modifications of the invention which fall within the true spirit and scope of the invention.

We claim:

1. A flexible cutting element fabricated from a plurality of chain links with tubular cutting units rigidly attached to each chain link, said cutting units each having a plurality of cutting teeth protruding upwardly from the body of the cutting units and disposed at intervals in a complete circle around the periphery of each cutting unit, wherein said cutting units are fabricated in two distinct forms with,
   (a) a first type of cutting unit fabricated with saw type cutting teeth configuration such that:
      (i) each cutting tooth contains a front cutting end protruding upwardly from the periphery of said cutting unit,
      (ii) the body of said cutting tooth then slopes downward to a back end which terminates at the same level as that of the base of the cutting unit,
      (iii) said front end of said cutting tooth being of a predetermined width and having a sharp cutting edge,
      (iv) said front cutting end fabricated with its sharp cutting edge slanted backwards at a predetermined angle to allow for the dislodging of cut wood particles,
   (b) a second knifing type cutting unit fabricated with:
      (i) a plurality of sharp, knife configured edges protruding upwardly from the body of said cutting unit and spaced at predetermined intervals in a complete circle around the periphery of said cutting unit,
      (ii) said knife configured edges protruding upwardly and extending in a straight line at the same predetermined height from a first front end to the back second end of said cutting unit,
   (c) the sawing type and knifing type cutting units attached to the chain links of the cutting element in a way such that,
      (i) each type of cutting unit is alternately attached to alternating chain links of the chain with the sawing type units attached first then a knifing type cutting unit attached second, followed again by another sawing type and knifing type cutting units thereby continuing to alternate each type of cutting unit as they are attached to the cutting element,
      (ii) the sawing type cutting units further aligned in such a way that the direction of cutting of one saw type cutting unit is opposite from the direction of cutting of the next saw type cutting unit, and these are continued to alternate as they are attached to the cutting element chain links so that when an oscillating force is imparted on the cutting element, half of the saw type cutting units will cut in one direction and the other half will cut in the opposite direction.

* * * * *